Figure 8:
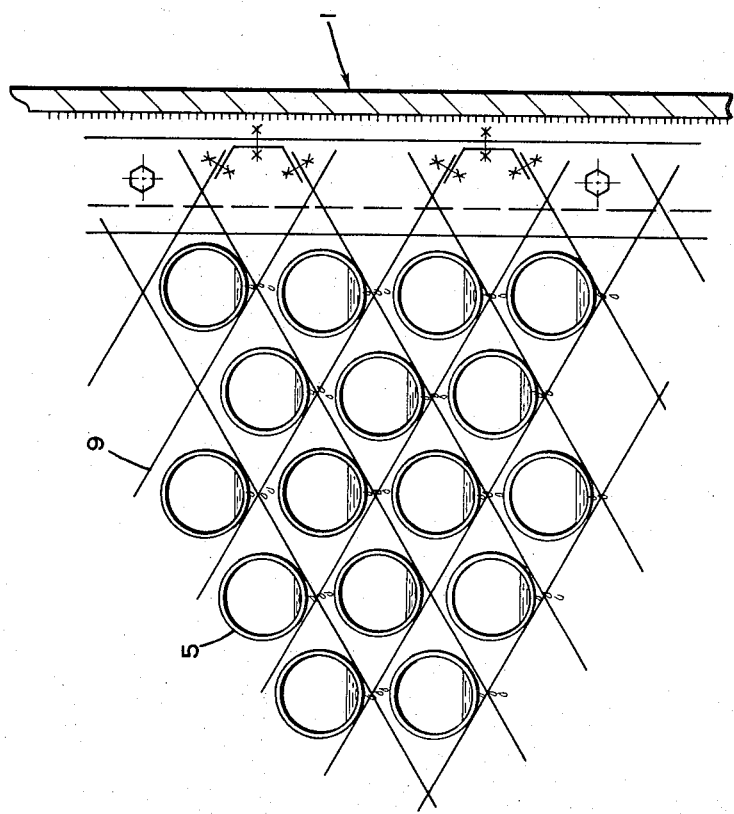

United States Patent
Barak et al.

[11] 3,868,308
[45] Feb. 25, 1975

[54] MULTIEFFECT EVAPORATOR

[75] Inventors: Amitzur Ze'ev Barak, Tel-Aviv; Joseph Michael Weinberg, Nethanya; Moshe Pachter, Tel-Aviv, all of Israel

[73] Assignee: Israel Desalination Engineering (Zarchin Process) Ltd., Tel-Baruch, Tel-Aviv, Israel

[22] Filed: Jan. 25, 1972

[21] Appl. No.: 220,650

[30] Foreign Application Priority Data
July 5, 1971 Israel.................................... 37225

[52] U.S. Cl................ 202/174, 202/236, 159/17 P
[51] Int. Cl............................................... B01d 1/22
[58] Field of Search................... 202/174, 173, 236; 159/13 B, 17 P

[56] References Cited
UNITED STATES PATENTS

| | | |
|---|---|---|
| 1,031,199 | 7/1912 | Rigney .............................. 159/13 B |
| 1,200,996 | 10/1916 | Soderlund ......................... 159/13 B |
| 1,506,001 | 8/1924 | Hughes............................. 159/13 B |
| 3,180,805 | 4/1965 | Chirico ................................ 202/173 |
| 3,497,422 | 2/1970 | Levite................................. 202/236 |
| 3,501,382 | 3/1970 | Roe..................................... 202/236 |
| 3,580,816 | 5/1971 | Tidball................................ 202/174 |
| 3,738,410 | 6/1973 | Ricca .............................. 159/13 B |

Primary Examiner—A. Louis Monacell
Assistant Examiner—Hiram H. Bernstein
Attorney, Agent, or Firm—Browdy and Neimark

[57] ABSTRACT

A multiple effect evaporator for use in the distillation of liquids in general and of the kind wherein evaporation takes place on the outside of substantially horizontal heat exchange tubes as a result of the heating of the inside of the tubes. The invention is particularly but not exclusively concerned with the use of such a multiple effect evaporator in the production of water from a solution of non-volatile solutes in water, for example sea water.

16 Claims, 8 Drawing Figures

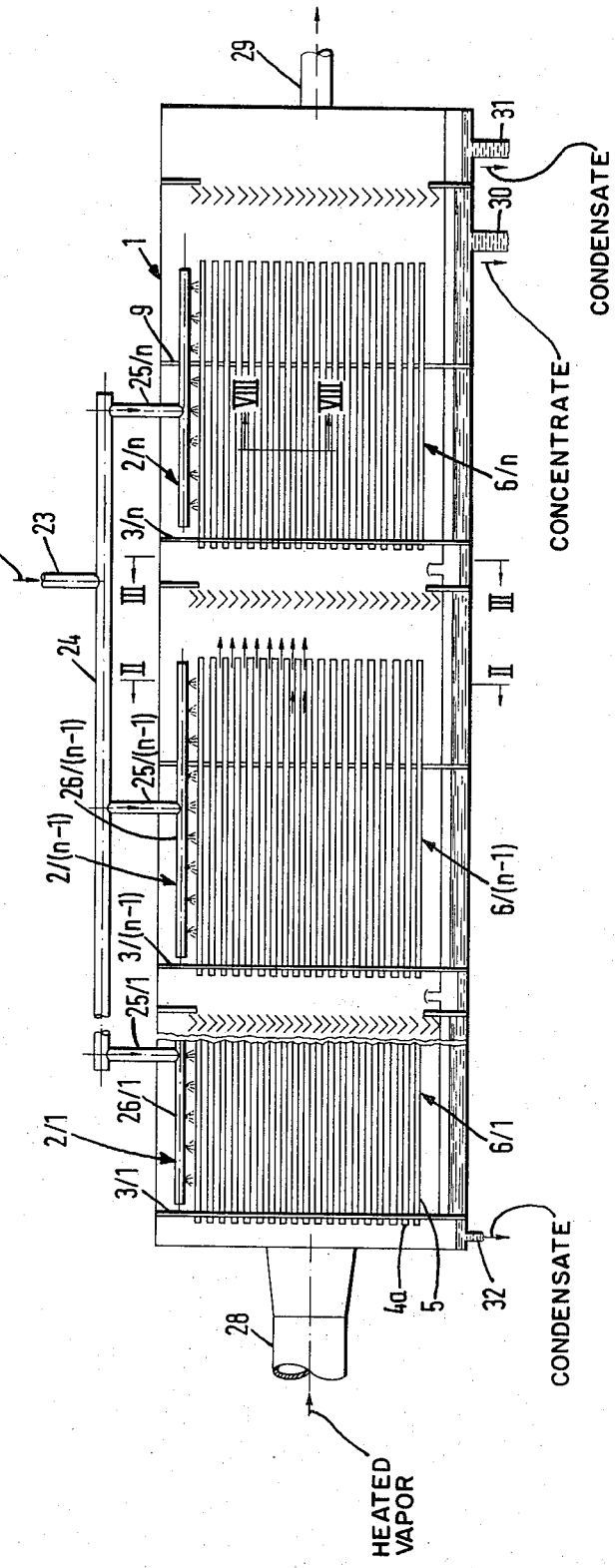

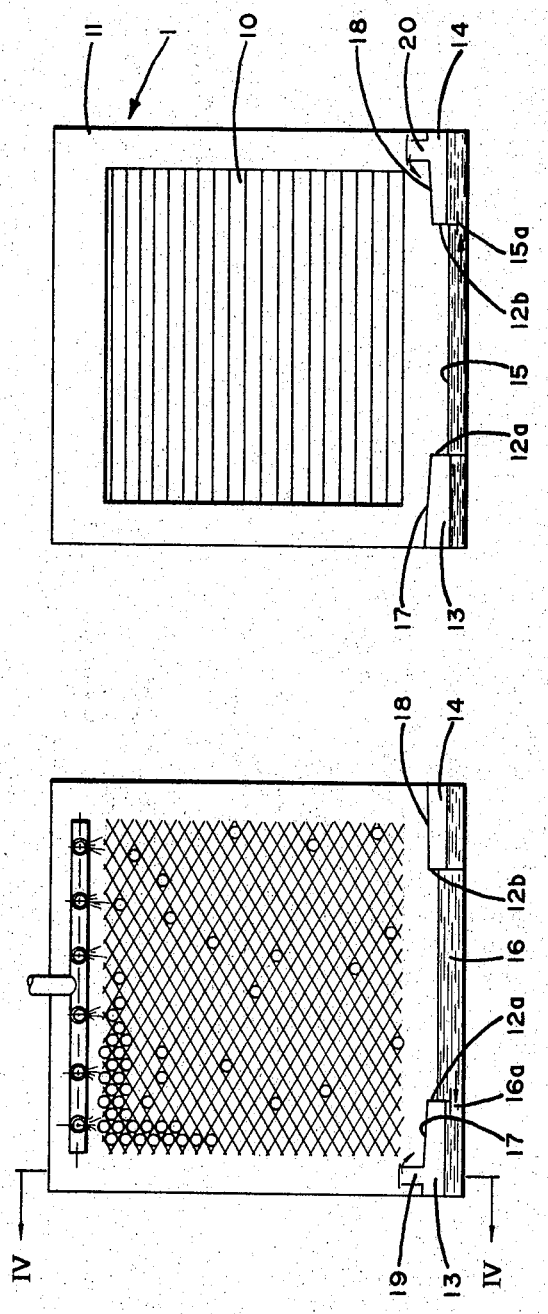

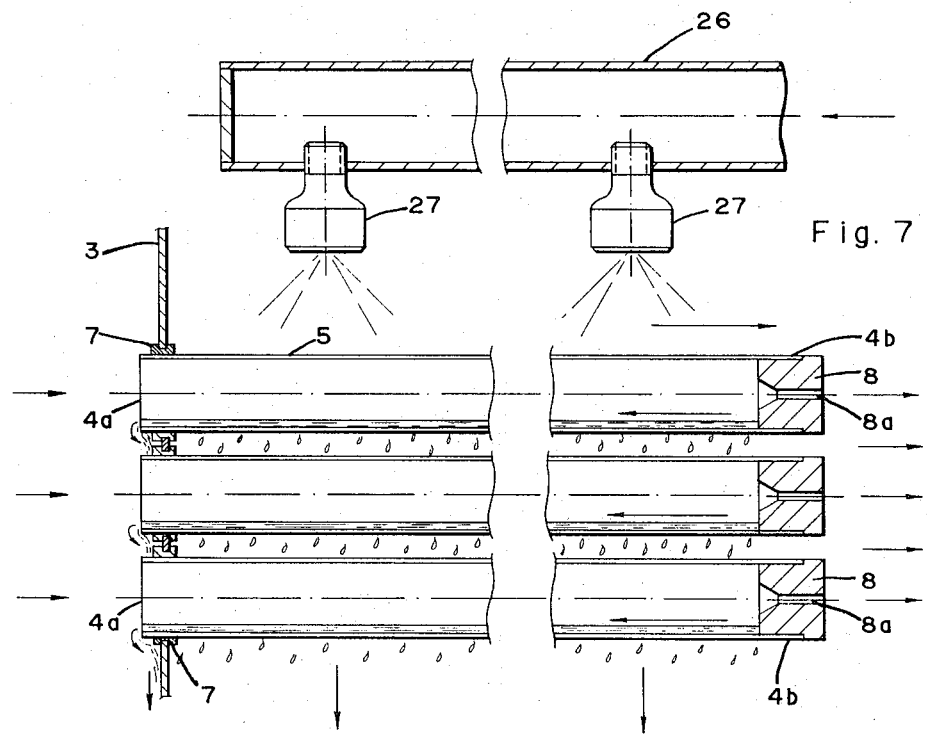
Fig. 7
Fig. 6
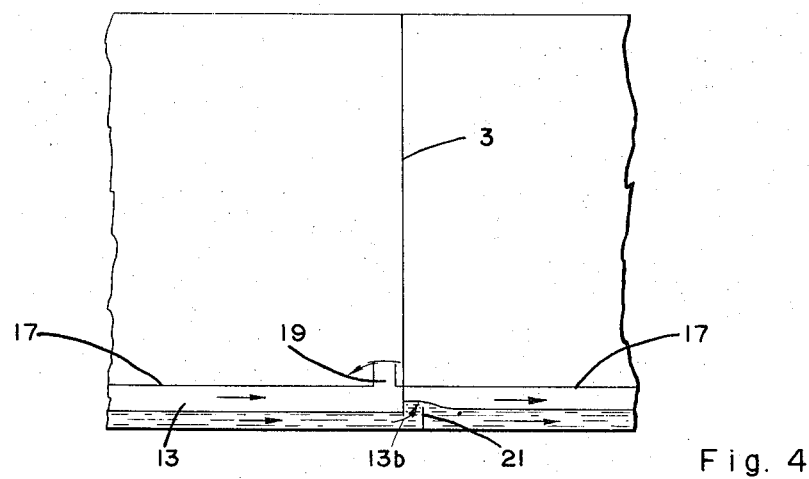
Fig. 4

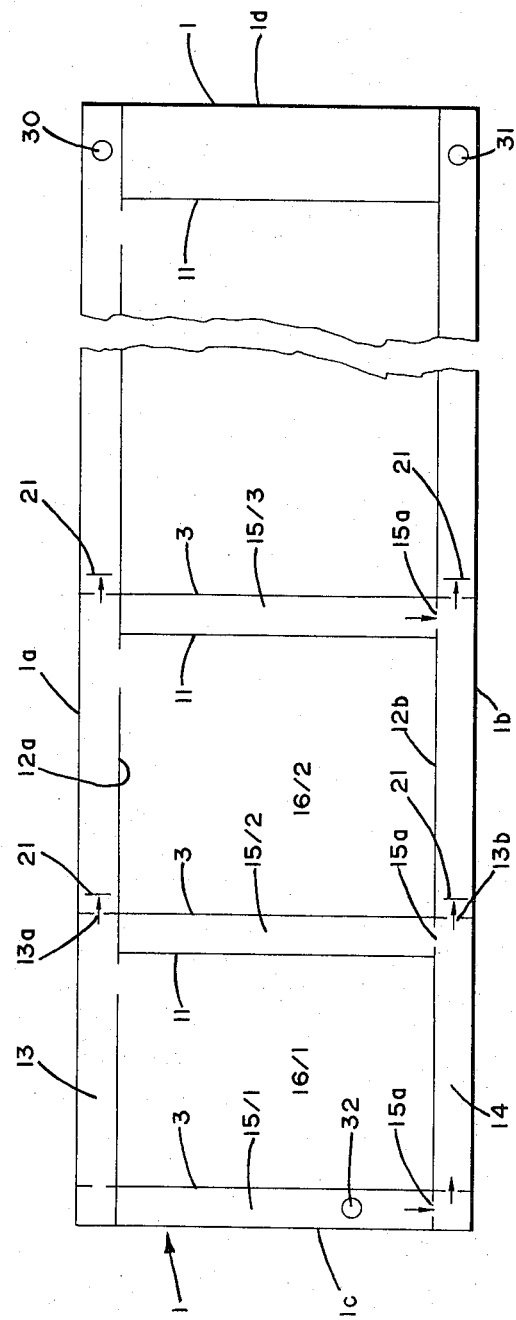

MULTIEFFECT EVAPORATOR

This invention relates to a multiple effect evaporator for use in the distillation of liquids in general and of the kind wherein evaporation takes place on the outside of substantially horizontal heat exchange tubes as a result of the heating of the inside of the tubes. The invention is particularly but not exclusively concerned with the use of such a multiple effect evaporator in the production of water from a solution of non-volatile solutes in water, for example sea water.

In known multi-effect evaporators of the kind with which the present application is specifically concerned the aqueous solution to be distilled is sprayed into each effect onto heat exchange tubes through which pass a higher temperature vapor. In consequence, at least a portion of the vapor in the exchange tube condenses, heat being transferred to the solution via the heat exchange tubes so as to cause the evaporation of a portion of the incoming solution in the effect the vapor thus produced passing into the heat exchange tubes of a subsequent effect and the unevaporated portion of the solution in one effect being passed to a subsequent effect where, under reduced vapor and temperature conditions, additional portions of the solution are evaporated.

In known evaporators of this type the heat exchange tubes of each effect constitute a bundle, the opposite ends of which are respectively secured to the rims of corresponding apertures formed in a pair of spaced apart tube sheets. The inlet end of each bundle is associated with a vapor entry box and the outlet end of each bundle is associated with a condensate and non-condensible extraction box.

With such a known form of multiple effect evaporator, the requirement for separate inlet and outlet boxes has the consequence that the available shell volume of the evaporator is not economically utilised with a corresponding deleterious effect on the compactness of the resulting plant.

It is furthermore found in practice that the provision of the inlet vapor box results in the introduction of the incoming, vapor substantially tangentially with respect to the associated tube sheet and in consequence the vapor is unevenly distributed among the constituent tubes of the bundle this resulting in inefficient operation in view of reduced non-condensible gas removal efficiency and loss in overall thermal performance.

Furthermore the provision of the inlet and outlet boxes carries as a result the fact that the vapor flowing from effect to effect undergoes numerous changes in direction and flow across section with corresponding flow losses.

It is an object of the present invention to produce a new and improved multiple effect evaporator wherein some or all of the above referred to disadvantages are obviated or reduced.

According to the present invention there is provided a multiple effect evaporator comprising a housing, a plurality of effects in the housing each effect being defined between two, substantially vertical parallel tube sheets, a plurality of bundles of substantially horizontally extending condenser tubes respectively located in said effects, the constituent tubes of each bundle being supported adjacent one set of open ends thereof by a tube sheet through which said ends extend and, at an intermediate position thereof, by an openwork grid through which the tubes extend and which is secured to the housing, sealing means for sealing said one set of ends to said tube sheet, an opposite set of ends of said constituent tubes being formed with restricted, non-condensible gas discharge vents, solution introducing means for introducing solutions into the upper portions of each effect so that the solution flows downwardly under gravity over and around said tubes, in film form, a heated vapor source from which heated vapors are introduced into the open ends of the tubes of a first and hottest effect so as to undergo heat exchanges with the down flowing solution in said effect as a result of which a portion of said solution vaporizes and at least a portion of said vapors condenses in said tubes, means for passing the vapors produced as a result of said vapourisation from one effect into the tubes of a subsequent effect vapor flows in each effect being in a direction substantially parallel to the tubes in that effect, and means for respectively collecting and removing condensate and concentrate products.

Preferably means are provided for passing the condensate and concentrate products from one effect respectively into the condensate and concentrate products of a subsequent effect.

In accordance with a preferred embodiment said sealing means is constituted by an electrically insulated resilient grommet.

Preferably said tubes and said tube sheets are formed aluminum or an aluminum alloy.

With a multiple effect evaporator in accordance with the present invention neighboring effects are separated solely by a single tube-sheet, vapors generated in each effect being capable of passing from effect to effect with minimal changes of direction and consequently minimal flow losses through the tube bundle, the open work support grid and in the passage from effect to effect.

In view of the fact that inflow of vapors to these condenser tubes is not via inlet boxes a uniform inflow takes place and the vapors are uniformly distributed amoung the constituent tubes of the bundles.

By virtue of the facts that the opposite ends of the tubes are provided with non-condensible gas venting apertures the venting of the non-condensible gases can be effected through appropriate sizing of these apertures whilst the passage of vapor out of these apertures can be clearly controlled whilst the passage of condensate can be prevented.

Furthermore, by virtue of the fact the tubes are preferably sealed to the tube sheet by means of elastic, electrically insulating grommets, galvanic corrosion can be effectively prevented. Furthermore, seeing that the tubes pass freely through the grid the problems which would normally arise as a result of differential thermal expansion of the tubes and the housing are taken care of.

For a better understanding of the present invention and to show how the same can be carried out in practice, reference will now be made to the accompanying drawings in which:

FIG. 1 is a longitudinally sectioned side elevation of a multiple effect evaporator in accordance with the present invention, FIG. 2 is a cross-section view of an effect shown in FIG. 1 taken around the line 11—11 (only some of the tube bundle being shown), FIG. 3 is a cross-sectional view of the evaporator shown in FIG. 1 taken along the line 111—111, FIG. 4 is a cross-sectional view of a part of the evaporator taken along the line 1V—1V shown in FIG. 2, FIG. 5 is a schematic plan view of the concentrate and condensate duct and collector assembly formed in the base of the evaporator.

FIG. 6 is a longitudinally sectioned view on an enlarged scale of some of the constituent tubes of a tube bundle shown in FIG. 1, FIG. 7 is a longitudinally sectioned view on an enlarged scale of a portion of a solvent distributor manifold of the kind shown in FIG. 1, and FIG. 8 is a cross-sectional view on an enlarged scale of a portion of a tube bundle shown in FIG. 1 taken along the line V111—V111 showing the supporting of the tube bundle by the support grid and the securing of the support grids to the evaporator housing.

As seen in FIG. 1 of the drawings, an evaporator is constituted by a housing 1 in which are formed a plurality of effects 2/1 to 2/n. The effects 2/1 to 2/n are respectively associated with the tube sheets 3/1 to 3/n so that each effect 2 (apart from the last effect 2/n) is defined between its own tube sheet and the tube sheet of the succeeding effect.

Each tube sheet 3 which is formed of a metallic material (preferably thin aluminum or aluminum alloy sheeting) is secured at its edges to the housing 1 and is formed with apertures. Extending through the tube sheet apertures are the open ends 4a of the constituent tubes 5 of a tube bundle 6, n such bundles 6/1 to 6/n being provided.

As can be clearly seen in FIG. 6 of the drawings the ends 4a of the tubes 5 are sealingly located in the apertures formed in the tube sheets 3 by virtue of the provision of resilient electrically insulating grommets 7 in each aperture of the tube sheet and through which the tubes sealingly extend. The opposite ends 4b of the constituents tubes 5 of the tube bundle 6 are closed with rubber bungs 8 in which are formed axial venting apertures 8a.

The constituent tubes 5 of each tube bundle 6 extend through and are supported by an openwork cross grid structure 9 which, as clearly seen in FIG. 8 of the drawings is secured to the side walls of the housing 1. The grid structure 9 is located with respect to the tube bundle in such a position as to afford adequate mechanical support for the tube bundle. As can be readily seen from FIG. 8 the open work grid structure 9 is so dimensioned that vapor flow through the grid structure can freely take place in a direction parallel to the longitudinal direction of the tubes.

Located opposite the tube sheet of each effect, other than the first, is a droplet separator panel 10 which is secured in a rectangular frame 11 which, in its turn is secured at its edges to the respective walls of the housing 1.

As can be clearly seen in the schematic FIG. 5 of the drawings, there is formed in the base portion of the evaporator housing 1 a series of inter-connecting concentrate and condensate collectors and ducts as follows:-

Extending parallel to the longitudinal side walls 1a and 1b of the housing 1 and slightly spaced thereon is a pair of longitudinal partition walls 12a and 12 b. Defined between the walls 1a and 12a is a longitudinally extending concentrate duct 13, the duct 13 of one effect communicating with the aligned duct 13 of the succeeding effect via a suitable aperture 13a formed in the transversely directed tube sheet 3.

Similarly the walls 12b and 1b define between them a longitudinally extending condensate duct 14, the condensate duct 14 of one effect communicating with the condensate duct 14 of the succeeding effect via apertures 13b formed in the transversely directed tube sheets 3.

Defined between the tube sheet 3 of the first effect and the transverse wall 1c of the housing is a first condensate collector 15/1 whilst defined between successive tube sheet 3 and frames 11 are successive condensate collectors 15/2, etc. The condensate collectors 15 communicate respectively with the condensate duct 14 via apertures 15a formed in partition wall 12b.

The bulk of the base area of each effect defined between the frame 11, tube sheet 3 and partition 12a and 12b constitutes a concentrate collector 16, each concentrate collector 16 communicating via an aperture 16a with the concentrate duct 13.

As can be seen clearly in FIGS. 2 and 3 of the drawings the concentrate and condensate ducts 13 and 14 are covered by vapor outlet openings 19 and 20 being formed in the covers 17 and 18.

Weirs 21 and 22 are located in the ducts 13 and 14 respectively just downstream of the openings 13a and 13b.

As can be seen in FIGS. 1 and 2 of the drawings, a solvent to be evaporated is fed via a main input pipe 23 into a main manifold 24 having output pipes 25/1 to 25/n respectively coupled to component manifolds 26/1 to 26/n respectively located in the effects 2/1 to 2/n. As seen clearly in FIG. 7 of the drawings each component manifold 26 is provided with a plurality of axially spaced apart outlet spray nozzles 27.

The housing 1 is provided, adjacent the first effect 2/1, with a main vapor inlet 28 and at its opposite remote end a main vapor outlet 29.

The last effect 2/n is provided with concentrate and condensate outlets 30 and 31 whilst the first effect 2/1 is optionally provided with a condensate outlet 32.

The operation of the evaporator will now be described with reference to its use in the distillation of sea water, it being clearly understood that the evaporator is equally applicable in the distillation of other solutions.

Incoming sea water is introduced through the main supply pipe 23, main manifold 24, component pipes 25 into the component manifold 26 from which it is sprayed into the respectively effects descending under gravity around the constituent tubes of the respective tube bundles in film form.

At the same time steam, for example from an external source, is introduced through the main vapor inlet 28 into the first effect, and, in view of the effective seal between the tube ends 4a and the tube sheet 3/1 the vapor is constrained to pass into the tubes. Heat exchange is effected between the hot vapor in the tubes and the down flowing liquid film outside the tubes, as a result of which condensation of the vapors in in the tubes takes place. The condensate thus produced flows out of the tubes (which are preferably slightly inclined with respect to the horizontal, downwardly with respect to their open ends 4a) and the outflowing condensate trickles down the tube sheet 3/1 and collects in the condensate collector 15/1. The condensate so collected can if desired be withdrawn from the condensate outlet 32 and fed back to an external heating source (in which case the aperture 15a is closed) or alternatively, with the outlet 32 closed, the condensate can flow into the condensate duct 14.

At the same time non-condensible gases accumlate in the tubes towards their ends 4b and are removed through the appropriate venting apertures 8a formed in the bungs 8.

Simultaneously the downflowing sea water partially evaporates so as to constitute, on the one hand, residual concentrate which flows downwardly into the concentrate collector 16/1 and, on the other hand, vapors which join together with the outflowing non-condensible gases to pass through the first droplet separator 10/1 where any entrained solution drops are separated out so as to join the remaining concentrate in the concentrate collector 16. The vapors which pass through the droplet separator enter the second effect (which is at a lower temperature and pressure than the first effect) and into the constituent tubes of the next tube bundle so as to undergo condensation as in the case of the previous effect.

Thus, in each effect vapors entering the constituent tubes of the tube bundle are condensed, the condensate flowing via the condensate collector 15 into the condensate duct 14. At the same time, down-flowing solution is partially vaporized, the vapors together with vented non-condensible gases flowing out of the effect via a droplet separator into the tubes of the subsequent effect where the procedure of condensation and evaporation is continued, residual concentrate formed in each effect passing into the concentrate collector via the concentrate collector into the common concentrate ducts.

The condensate flowing in the condensate duct 14 from an upstream hotter effect into a downstream cooler effect, there to join the condensate which has trickled down from the tubes in that effect. The combined condensate is therefore at a higher temperature than the effect in which it is located and undergoes flash evaporation this resulting in the production of vapor which join the other vapors produced in that downstream effect to pass into the next successive downstream effect, the residual condensate stream in the effect being thereby cooled.

Similarly the concentrate stream flowing in the duct 13 from effect to effect also undergoes flash evaporation with the consequential production of vapors and cooling of the residual stream.

The provision of the weirs 21 and 22 just opposite the respective openings 30a and 30b tend to facilitate such flash evaporation. It will be realized that the vapor produced as a result of the flash evaporation of the concentrate and condensate streams in the ducts 13 and 14 emerge into the effect via the apertures 19 and 20.

In the final effect the vapor produced together with the accumulated non-condensible gases which have cascaded from effect to effect are removed via the outlet 29 which can be coupled to a condenser or alternatively to the suction end of a compression system. In the latter event the stream produced by the discharge end of the compression system can be used, with appropriate make-up, so as to constitute the input steam fed into the vapor input 28.

Alternatively, the output vapors removed from the final effect of the evaporator can be directly introduced into the vapor inlet of a subsequent evaporator designed to operate under lower temperature conditions. In this case the evaporator just described can form one of several evaporators connected in series.

As a further alternative the final effect can be used as a condenser, i.e., subjected to the input of large quantities of cold solution and in this case very little if any vapors are produced and those which are produced are removed together with the non-condensible gases via the outlet pipe to an evacuation system.

In all cases, however, the resultant condensate, in the present case sweetened water, is removed via the output 31 whilst the concentrate is removed via the outlet 30.

It will be appreciated that the manner in which the constituent tubes of each tube bundle are supported by an openwork grid allows for the relatively unhindered flow of vapors produced in each effect substantially in the direction of the tubes and in consequence such vapors flow from effect to effect takes place with a negligible pressure drop.

Furthermore, by virtue of the fact that the concentrate and condensate stream which flow in the ducts 13 and 14 pass from one effect to the next colder effect through apertures which are submerged, an effective liquid seal is thereby provided between the effects which safeguards against vapor short circuiting. Furthermore, in view of the existence of a pressure differential between adjacent effects the concentrate and condensate stream flow from effect to effect with practically no loss of level.

The supporting of the open ends 4a of the constituent tubes 5 of the tube bundle 6 of each effect in resilient electrically insulating grommets (preferably of rubber) located in appropriate apertures formed in the tube sheet not only consitutes an extremely simple way of sealingly securing the tube sheet, but also ensures that any relative expansion of the tubes with respect to the tube sheet is effectively taken up by the resilient grommets. Furthermore, by viture of the electrical insulating nature of these grommets galvanic corrosion of the system is effectively prevented.

The size of the axial venting apertures 8a formed in the bung 8 determines the volume of non-condensible gases which can be removed from the tubes under the particular pressure differential conditions which exist between the inside and the outside of the tubes. Thus by varying the size (for example by replacing bungs with venting apertures of one size by bungs with venting apertures of another size) differing volumes or concentrations or preferably, partial pressures of non-condensible gases can be bled from the system.

Whilst the tubes and tube sheets can be made of any suitable metallic material the face that, with this evaporator and using water, operation can take place under relatively low temperature conditions allows for the use of aluminum or aluminum alloy with consequential considerable economic advantages.

It will be appreciated that whilst in accordance with the specific examples described the solution to be distilled is introduced in parallel into all the effects, other forms of solution introduction can be adopted and where desired the incoming solution can be pre-heated.

Similarly, the particular mode of condensate and concentrate flow from effect to effect described above can be varied as desired.

Finally, as has been clearly mentioned, the evaporator just described is capable of use wherever it is desired to effect distillation of an incoming solution irrespective of its nature.

We claim:

1. A multiple effect evaporator, comprising:
   a housing;
   a plurality of substantially vertical parallel tube sheets connected to the interior of said housing;
   a plurality of effects in said housing each effect defined between a pair of said tube sheets the effects being substantially aligned;
   a plurality of substantially aligned bundles of substantially horizontally extending condenser tubes, one of said bundles being located in each of said effects, the constituent tubes of each said bundle being supported adjacent one set of open ends thereof by one of said tube sheets through which said ends extend;
   a plurality of openwork grids connected to the interior of said housing through each of which the tubes of one of said bundles extend;
   sealing means for sealing said sets of open ends to said tube sheets;
   non-condensible gas discharge vents with restricted diameter compared with the inner diameter of said tubes, connected to the ends of said tubes opposite the tube sheet ends;
   solution introducing means for introducing solution into the upper portions of each effect in such a manner that it flows downwardly under gravity in film form over and around said tubes;
   heated vapor introducing means for introducing heated vapors into the open ends of the tubes of the first and hottest effect to undergo heat exchange with the downflowing solution in said effect, as a result of which a portion of the solution vaporizes and at least a portion of the vapors condenses in said tubes;
   vapor passing means for passing the vapors from one effect into the tubes of a subsequent effect, in such a manner that vapor flow in each effect is in a direction substantially parallel to the tubes in that effect and the passage of vapors throughout all the effects involving substantially no changes in flow direction; and
   collecting means for respectively collecting and removing condensate and concentrate products.

2. A multiple effect evaporator according to claim 1 further including means for passing condensate and concentrate products from one effect respectively into the condensate and concentrate products of a subsequent effect.

3. A multiple effect evaporator according to claim 1 further including means for returning at least a portion of the condensate product produced in the first effect to said heated vapor introducing means.

4. A multiple effect evaporator according to claim 1, further including a condenser and means for passing the vapors produced in a final and coolest effect together with the non-condensible gases which accumulate in that effect to said condenser.

5. A multiple effect evaporator according to claim 1, further including a compression system and wherein the vapor outlet in the final and coolest effect is coupled to the suction of said compression system, the discharge of which is coupled to said heated vapor introducing means or a first effect of a subsequent and similar evaporator.

6. A multiple effect evaporator according to claim 1, further including a compression system and wherein the final and coolest effect serves as a condenser which is coupled to the suction end of said compression system for the purpose of removing non-condensible gases.

7. A multiple effect evaporator according to claim 1, wherein said collecting means collects and removes the total concentrate and condensate products from the final and coolest effect.

8. A multiple effect evaporator according to claim 1, wherein said solution introducing means comprises a manifold by which said solution is introduced in parallel into said effects.

9. A multiple effect evaporator according to claim 1, wherein each tube extends through a corresponding aperture formed in said tube sheet and wherein said sealing means comprise a resilient electrically insulating grommet located in each of said apertures.

10. A multiple effect evaporator according to claim 1, further including bungs filling the ends of said tubes opposite the tube sheet ends and wherein said vents are located in said bungs.

11. A multiple effect evaporator according to claim 1, further including a plurality of a droplet separator arrangements, each of which being secured to said housing between the vented ends of said tubes of one effect and the tube sheet of the subsequent effect.

12. A multiple effect evaporator according to claim 1, wherein said collecting means includes, in the base portion of each effect, a concentrate collector, a concentrate duct communicating with said concentrate collector, a condensate trough, and a condensate duct communicating with the condensate trough, concentrate and condensate ducts of successive effects respectively communicating with each other.

13. A multiple effect evaporator according to claim 1, wherein said tubes are slightly inclined with respect to the horizontal downwardly with respect to said open ends.

14. A multiple effect evaporator according to claim 1, wherein said tubes are formed of aluminum or an aluminum alloy.

15. A multiple effect evaporator according to claim 1, wherein said tubes sheets are formed of aluminum or aluminium alloy.

16. A multiple effect evaporator according to claim 1, for use in the desalination of water where said solution is brackish or sea water and wherein said vapors are constituted by steam.

* * * * *